(12) United States Patent
Shiwaya (10) Patent No.: US 9,584,019 B2
(45) Date of Patent: Feb. 28, 2017

(54) SWITCHING REGULATOR AND CONTROL METHOD THEREOF

(71) Applicant: Yohichi Shiwaya, Osaka (JP)

(72) Inventor: Yohichi Shiwaya, Osaka (JP)

(73) Assignee: RICOH ELECTRONIC DEVICES CO., LTD., Osaka (JP)

( * ) Notice: Subject to any disclaimer, the term of this patent is extended or adjusted under 35 U.S.C. 154(b) by 0 days.

(21) Appl. No.: 14/425,517

(22) PCT Filed: Sep. 3, 2013

(86) PCT No.: PCT/JP2013/074174
§ 371 (c)(1),
(2) Date: Mar. 3, 2015

(87) PCT Pub. No.: WO2014/038684
PCT Pub. Date: Mar. 13, 2014

(65) Prior Publication Data
US 2015/0229212 A1    Aug. 13, 2015

(30) Foreign Application Priority Data
Sep. 4, 2012    (JP) .................... 2012-194276

(51) Int. Cl.
*G05F 1/56*    (2006.01)
*H02M 3/158*   (2006.01)
(Continued)

(52) U.S. Cl.
CPC .......... *H02M 3/158* (2013.01); *H02M 3/156* (2013.01); *H02M 3/1588* (2013.01);
(Continued)

(58) Field of Classification Search
CPC .............. H02M 3/1588; H02M 3/158; H02M 2001/0012; H02M 3/156; Y02B 70/16
(Continued)

(56) References Cited

U.S. PATENT DOCUMENTS 7,061,213 B2 * 6/2006 Yoshida ................ H02M 3/156
                                                323/224
8,035,365 B2 * 10/2011 Kikuchi ................ H02M 3/156
                                                323/282

(Continued)

FOREIGN PATENT DOCUMENTS

CN    101610033 A    12/2009
CN    102460927 A     5/2012
(Continued)

OTHER PUBLICATIONS

International Search Report issued on Oct. 15, 2013 in PCT/JP2013/074174 filed on Sep. 3, 2013.
(Continued)

*Primary Examiner* — Rajnikant Patel
(74) *Attorney, Agent, or Firm* — Cooper & Dunham LLP (57) ABSTRACT

A switching regulator including an output switch element; a rectification switch element; an oscillation circuit; an error amplifier circuit; a slope circuit; a first voltage comparison circuit; a second voltage comparison circuit; a one pulse generation circuit; a control circuit; and a backflow detection circuit, and a control method thereof suppress variations to be stabilized with respect to a target value of the load current for switching between a PWM control and a PFM control, and ensure the switching from the PFM control to the PWM control or from the PWM control to the PFM control even if various parameters including external elements such as chips, coils, and capacitors vary.

9 Claims, 6 Drawing Sheets

(51) Int. Cl.
*H02M 3/156* (2006.01)
*H02M 1/00* (2006.01)

(52) U.S. Cl.
CPC ............... *H02M 2001/0009* (2013.01); *H02M 2001/0032* (2013.01); *Y02B 70/1466* (2013.01); *Y02B 70/16* (2013.01)

(58) Field of Classification Search
USPC ................................................. 323/282–285
See application file for complete search history.

(56) References Cited

U.S. PATENT DOCUMENTS

| | | | | |
|---|---|---|---|---|
| 8,242,764 | B2 * | 8/2012 | Shimizu | H02M 3/1588 323/284 |
| 8,570,019 | B2 * | 10/2013 | Nakamura | H02M 3/156 323/284 |
| 8,829,876 | B2 * | 9/2014 | Michishita | H02M 3/158 323/284 |
| 8,957,658 | B2 * | 2/2015 | Nakamura | H02M 1/08 323/284 |
| 2008/0231209 | A1 | 9/2008 | Shiwaya et al. | |
| 2009/0033305 | A1 | 2/2009 | Hane | |
| 2009/0218999 | A1 | 9/2009 | Kikuchi | |
| 2009/0261753 | A1 | 10/2009 | Kishioka et al. | |
| 2009/0315523 | A1 | 12/2009 | Kumagai et al. | |
| 2009/0322299 | A1 | 12/2009 | Michishita et al. | |
| 2010/0188065 | A1 | 7/2010 | Shiwaya | |
| 2010/0277227 | A1 | 11/2010 | Shiwaya | |
| 2011/0133708 | A1 | 6/2011 | Shiwaya | |

FOREIGN PATENT DOCUMENTS

| | | |
|---|---|---|
| JP | 2002-58239 | 2/2002 |
| JP | 2003-219637 | 7/2003 |
| JP | 2007-209180 | 8/2007 |
| JP | 2008-79378 | 4/2008 |
| JP | 2008-92712 | 4/2008 |
| JP | 2008-206214 | 9/2008 |
| JP | 2009-213228 | 9/2009 |
| JP | 2009-225642 | 10/2009 |
| JP | 2009-254009 | 10/2009 |
| JP | 2009-278713 | 11/2009 |
| JP | 2010-63276 | 3/2010 |

OTHER PUBLICATIONS

Nov. 2, 2016 Chinese official action (including English translation) in corresponding Chinese Patent Application No. 201380055521.0.

* cited by examiner

SWITCHING REGULATOR AND CONTROL METHOD THEREOF

TECHNICAL FIELD

The present invention relates to a switching regulator, and particularly relates to a non-isolated type switching regulator having a pulse width modulation (hereinafter, referred to as PWM) control mode and a pulse frequency modulation (hereinafter, referred to as PFM) control mode, and including an inductor which performs the PFM control when a load current decreases, and a control method thereof.

BACKGROUND ART

Recently, power saving for electronic equipment is always required. In order to achieve the power saving, emphasis is laid on the reduction of electric power consumed by the electronic equipment, and the suppression of wasteful consumption of electric power by improving the efficiency of a power supply circuit itself which supplies a voltage to the electronic equipment. The power supply circuits widely use switching regulators capable of supplying input electric power with a high efficiency.

In switching regulators, a PWM control or a PFM control is widely known. In the PFM control, the control is performed such that the on time period of a switching element is made to be longer when the output voltage falls, and the on time period of a switching element is made to be shorter when the output voltage rises. In the PWM control, the control is performed such that the oscillation frequency of a drive pulse is made to be constant and the pulse width is changed in accordance with the load. Moreover, the PFM control further includes a method in which an on-timing is controlled at a certain fixed frequency, and the on-timing is skipped, thereby achieving a pseudo-PFM control operation.

As a control method of automatically switching between the PWM control and the PFM control, for example, Japanese Patent number 3647811, and Japanese Patent Application Publication Publication number 2010-063276 disclose a configuration in which an operation is automatically switched from a PWM control operation to a PFM control operation or from a PFM control operation to a PWM control operation, on the basis of an error amplification output voltage generated from the difference between a partial voltage value of an output voltage from a switching regulator and a reference voltage from a reference voltage source.

Moreover, for example, Japanese Patent Application Publication Number 2008-092712 discloses a configuration in which a differential time generation means for forming a differential time signal indicating a differential time corresponding to a difference between the pulse width of a PWM control signal and the pulse width of a PFM control signal is included, and operation modes are switched by comparing the differential time signal with a reference signal for forming the PWM control signal in accordance with the differential time on the basis of the differential time signal.

Moreover, for example, Japanese Patent Application Publication number 2009-213228 discloses a configuration in which a circuit which counts the number of pulses of a PWM control signal and the number of pulses of a PFM control signal is included, and a reference of the number of pulses with respect to each of the number of pulses for shifting a mode from a PFM control to a PWM control and a mode from a PWM control to a PFM control is provided, in such a manner that switching the operation modes is controlled on the basis of a result of counting the pulses under the PFM control or a result of counting the pulses under the PWM control.

Moreover, for example, Japanese Patent Application Publication number 2009-225642 discloses a configuration in which a backflow current of an inductor current flowing from an output of a switching regulator to an output switch side is detected, and on the basis of a detection signal thereof, switching from a PFM control to a PWM control or from a PWM control to a PFM control is controlled.

SUMMARY OF THE INVENTION

However, in the inventions described in Japanese Patent number 3647811, and Japanese Patent Application Publication numbers 2010-063276, 2008-092712, 2009-213228, and 2009-225642, a circuit which generates a PFM pulse width and a circuit which generates a PWM pulse width are turned on all the time, which results in a state where a large amount of currents are consumed. Moreover, there is a problem in that variations with respect to a load current for switching the PWM control and the PFM control occur because it is difficult to obtain the desired load current under the input and output conditions in the wide range.

Moreover, in the invention described in Japanese Patent publication number 2010-063276, the reference voltage of a level detection circuit for the error amplification output voltage is set such that a load current for switching the operation mode becomes equal to the current value at a critical point to shift from a discontinuous operation mode controlling to prevent a backflow of the inductor current from the inductor to the output switch side to a continuous operation mode. However Japanese Patent Publication number 2010-063276 fails to disclose a concrete configuration example thereof.

An object of the present invention is to solve the above problems, and to provide a switching regulator and a control method thereof which are capable of further suppressing variations to be stabilized with respect to a target value of the load current for switching between the PWM control and the PFM control compared with the related art, and ensuring the switching from the PFM control to the PWM control or from the PWM control to the PFM control even if various parameters including external elements such as chips, coils, and capacitors vary.

In order to achieve the above object, an embodiment of the present invention provides: a non-isolated type switching regulator which converts an input voltage inputted to an input terminal into a predetermined constant voltage and outputs the constant voltage as an output voltage from an output terminal to a load through an inductor, and has a switching function between a PWM control and a PFM control, the switching regulator comprising: an output switch element which performs switching in accordance with a control signal inputted to a control electrode, and charges the inductor with the input voltage; a rectification switch element which discharges the inductor when the output switch element is turned off to stop the charging to the inductor; an oscillation circuit which outputs a clock signal having a predetermined oscillation frequency; an error amplifier circuit which amplifies a voltage difference between a feedback voltage proportional to the output voltage and a predetermined first reference voltage, and outputs the voltage difference as an error voltage; a slope circuit which generates a saw-tooth wave providing a voltage change set in advance so as to be in synchronization with the switching of the output switch element; a first voltage comparison circuit which compares a voltage of the sawtooth wave and the error voltage, and generates and outputs a first comparison signal indicating a result of the comparison; a second voltage comparison circuit which compares the error voltage and a predetermined second reference voltage, and generates and outputs a second comparison signal indicating a result of the comparison; a one pulse generation circuit which generates a one pulse signal having a predetermined pulse width; a control circuit which controls switching for the output switch element and the rectification switch element on the basis of the clock signal, the first comparison signal, the second comparison signal, and the one pulse signal; and a backflow detection circuit which detects a sign of generation of a reverse current or generation of the reverse current, the reverse current flowing from the output terminal to the rectification switch element side through the inductor, on the basis of a voltage at a connection point between the output switch element and the rectification switch element, wherein the predetermined second reference voltage has a dependency on the input voltage and the output voltage, and is arbitrarily set between a lower limit value and an upper limit value of the saw-tooth wave, and the control circuit controls the oscillation circuit such that the oscillation circuit starts an oscillation operation to output the clock signal in accordance with the second comparison signal, and controls the one pulse generation circuit such that the one pulse generation circuit outputs the one pulse signal, controls the first voltage comparison circuit such that the first voltage comparison circuit turns on/off in accordance with the second comparison signal and the clock signal, and controls the output switch element such that the pulse width of the one pulse signal becomes an on time period of the output switch element, the control circuit performs a control to perform a PFM control operation in which a switching cycle of the output switch element is changed while the on time period thereof is fixed, on the basis of the second comparison signal, the clock signal, the pulse width of the one pulse signal, in a case of a light load where the load is less than a predetermined first threshold, and performs a control to perform a PWM control operation in which the on time period of the output switch element is changed while the switching cycle thereof is fixed, on the basis of the second comparison signal, the clock signal, and the output signal from the first voltage comparison circuit, in a case of a heavy load where the load is not less than the first threshold, or not less than a second threshold which is more than the first threshold, the control circuit performs a control such that the PFM control and the PWM control are automatically switched on the basis of the second comparison signal and the clock signal, and the second voltage comparison circuit changes a signal level of the second comparison signal on the basis of a combination state of a backflow detection signal as an output of the backflow detection circuit and the clock signal to cause the one pulse signal to have the dependency on the input voltage and the output voltage, to change the on time period of the output switch element on the basis of the input voltage and the output voltage, and to output the one pulse signal using the first comparison signal as a trigger on the basis of a combination state of the second comparison signal, the backflow detection signal, and the clock signal.

In order to achieve the above object, an embodiment of the present invention provides: a control method of a non-isolated type switching regulator which converts an input voltage inputted to an input terminal into a predetermined constant voltage and outputs the constant voltage as an output voltage from an output terminal to a load through an inductor, and has a switching function between a PWM control and a PFM control, the switching regulator including: an output switch element which performs switching in accordance with a control signal inputted to a control electrode, and charges the inductor with the input voltage; a rectification switch element which discharges the inductor when the output switch element is turned off to stop the charging to the inductor; an oscillation circuit which outputs a clock signal having a predetermined oscillation frequency; an error amplifier circuit which amplifies a voltage difference between a feedback voltage proportional to the output voltage and a predetermined first reference voltage, and outputs the voltage difference as an error voltage; a slope circuit which generates a saw-tooth wave providing a voltage change set in advance so as to be in synchronization with the switching of the output switch element; a first voltage comparison circuit which compares a voltage of the saw-tooth wave and the error voltage, and generates and outputs a first comparison signal indicating a result of the comparison; a second voltage comparison circuit which compares the error voltage and a predetermined second reference voltage, and generates and outputs a second comparison signal indicating a result of the comparison; a one pulse generation circuit which generates a one pulse signal having a predetermined pulse width; a control circuit which controls switching for the output switch element and the rectification switch element on the basis of the clock signal, the first comparison signal, the second comparison signal, and the one pulse signal; and a backflow detection circuit which detects a sign of generation of a reverse current or generation of the reverse current, the reverse current flowing from the output terminal to the rectification switch element side through the inductor, on the basis of a voltage at a connection point between the output switch element and the rectification switch element, wherein the predetermined second reference voltage having a dependency on the input voltage and the output voltage and being arbitrarily set between a lower limit value and an upper limit value of the saw-tooth wave, the control method comprises the steps, performed by the control circuit, of: controlling the oscillation circuit such that the oscillation circuit starts an oscillation operation to output the clock signal in accordance with the second comparison signal, and controlling the one pulse generation circuit such that the one pulse generation circuit outputs the one pulse signal; controlling the first voltage comparison circuit such that the first voltage comparison circuit turns on/off in accordance with the second comparison signal and the clock signal; controlling the output switch element such that the pulse width of the one pulse signal becomes an on time period of the output switch element, performing a control to perform a PFM control operation in which a switching cycle of the output switch element is changed while the on time period thereof is fixed, on the basis of the second comparison signal, the clock signal, the pulse width of the one pulse signal, in a case of a light load where the load is less than a predetermined first threshold, and performing a control to perform a PWM control operation in which the on time period of the output switch element is changed while the switching cycle thereof is fixed, on the basis of the second comparison signal, the clock signal, and the output signal from the first voltage comparison circuit, in a case of a heavy load where the load is not less than the first threshold, or not less than a second threshold which is more than the first threshold; and performing a control such that the PFM control and the PWM control are automatically switched on the basis of the second comparison signal and the clock signal.

DESCRIPTION OF EMBODIMENTS

Hereinafter, an embodiment according to the present invention will be described with reference to the drawings. Note that, in the following embodiment, same components are denoted with same reference numerals.

Figure 1:
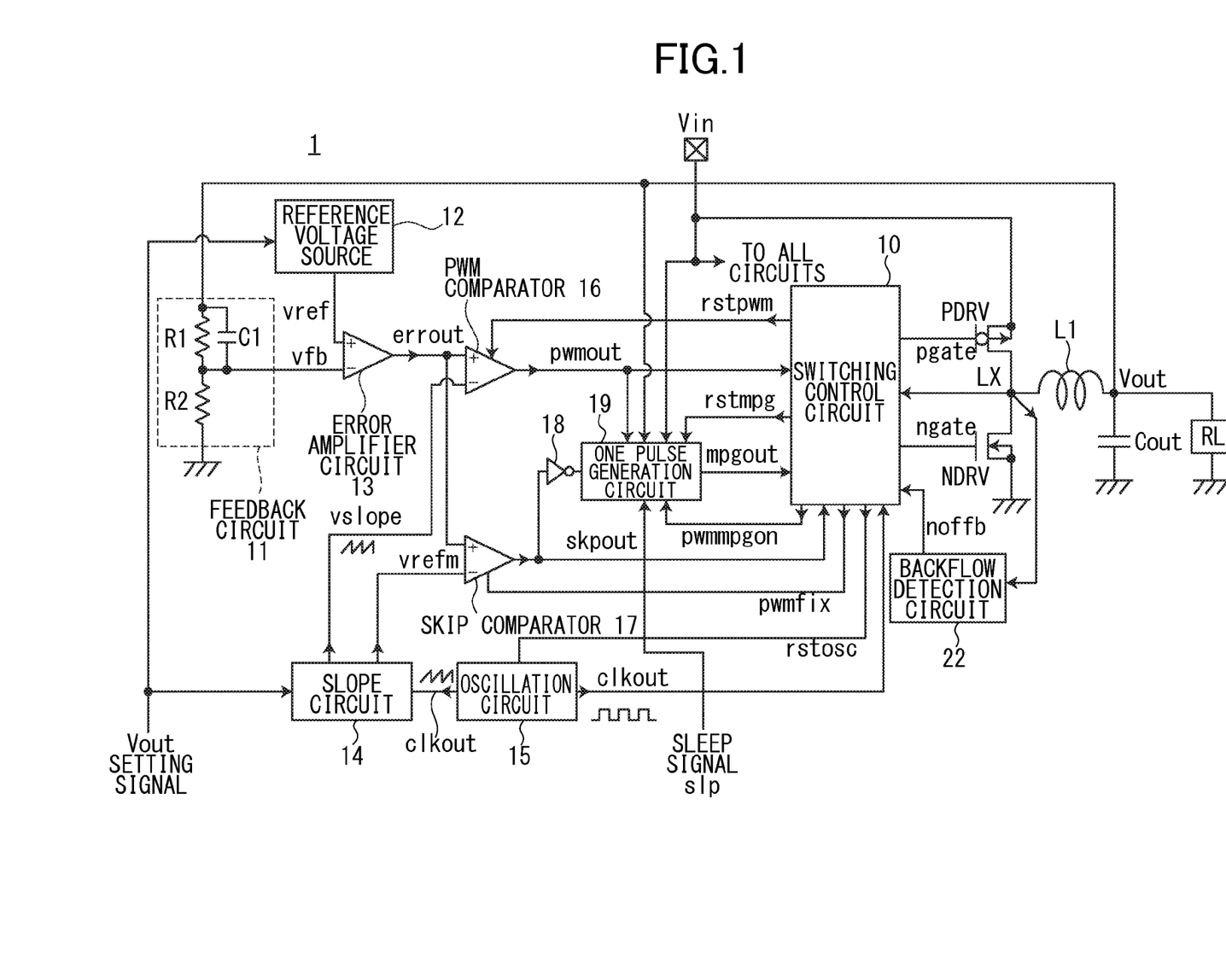
FIG. 1 is a circuit diagram illustrating a configuration example of a switching regulator 1 according to an embodiment of the present invention.

FIG. 1 is a circuit diagram illustrating a configuration example of a switching regulator 1 according to the embodiment of the present invention. In FIG. 1, the switching regulator 1 converts an input voltage Vin into a predetermined set voltage and supply the set voltage as an output voltage Vout from an output terminal to a load RL, and is configured to include a feedback circuit 11 of an output voltage, a reference voltage source 12, an error amplifier circuit 13, a slope circuit 14, an oscillation circuit 15, a PWM comparator 16, a skip comparator 17, an inverter 18, a one pulse generation circuit 19, a backflow detection circuit 20, a switching control circuit 10, a P-channel MOS electric field effect transistor (hereinafter, referred to as output switch element) PDRV as an output switch, an N-channel MOS electric field effect transistor (hereinafter, referred to as rectification switch element) NDRV as an rectification switch, an inductor L1, and an output smoothing capacitor Cout. Note that, the input voltage Vin is supplied to all of the circuits in the switching regulator 1.

The feedback circuit 11 is configured to include two resistances R1 and R2, and a capacitor C1 connected in parallel with the resistance R1, and generates a feedback voltage vfb from the output voltage Vout by resistance dividing to output the feedback voltage vfb to an inverting input terminal of the error amplifier circuit 13. The reference voltage source 12 includes a DA converter, and generates, on the basis of a Vout setting signal inputted from an external circuit, a predetermined reference voltage vref corresponding to the Vout setting signal and outputs the reference voltage vref to a non-inverting input terminal of the error amplifier circuit 13. The error amplifier circuit 13 generates and amplifies an error between the two voltages vfb and vref to be inputted, and generates an error voltage errout between the feedback voltage vfb and the reference voltage vref to output the error voltage errout to a non-inverting input terminal of the PWM comparator 16.

Meanwhile, the slope circuit 14 generates a saw-tooth wave vslope in synchronization with a clock signal (clock signal or saw-tooth wave synchronized with the clock signal) clkout outputted from the oscillation circuit 15 and outputs the saw-tooth wave vslope to an inverting input terminal of the PWM comparator 16, and generates, on the basis of the abovementioned Vout setting signal, a pulse skip reference voltage vrefm which is a reference voltage of the skip comparator 17 and a reference for pulse skip determination and outputs the pulse skip reference voltage vrefm to an inverting input terminal of the skip comparator 17. Here, the slope circuit 14 shifts, on the basis of the saw-tooth wave outputted from the oscillation circuit 15 and synchronized with the clock signal clkout, the level of the saw-tooth wave vslope within a voltage range set in advance in such a manner that the error voltage errout of the error amplifier circuit 13 can hold a gain of a predetermined value or more and outputs the saw-tooth wave vslope. Here, the pulse skip indicates to skip on-pulse of the output switch element PDRV. The PWM comparator 16 compares the voltage of the error voltage errout with the voltage of the saw-tooth wave vslope to create a PWM signal pwmout to output it to the one pulse generation circuit 19 and the switching control circuit 10. The skip comparator 17 compares the voltage of the error voltage errout with the voltage of the pulse skip reference voltage vrefm to create a pulse skip detection signal skpout to output it to the switching control circuit 10, and to the one pulse generation circuit 19 through the inverter 18. The one pulse generation circuit 19 generates a one pulse signal mpgout using an inverted signal of the pulse skip detection signal skpout as a trigger to output it to the switching control circuit 10. The backflow detection circuit 20 monitors a voltage VLX at a connection point LX among the output switch element PDRV, the rectification switch element NDRV, and the inductor L1, and generates, when detecting generation or a sign of a reverse current flowing from the output terminal to the rectification switch element NDRV side through the inductor L1, a backflow detection signal noffb to output it to the switching control circuit 10.

The switching control circuit 10 has a function of controlling switching between a PFM control and a PWM control and controlling on/off for the output switch element PDRV and the rectification switch element NDRV, and on the basis of the abovementioned multiple signals to be inputted, (a) generates a reset control signal rstosc for the oscillation circuit 15 to output it to the oscillation circuit 15, (b) generates a reset control signal rstmpg for the one pulse generation circuit 19 to output it to the one pulse generation circuit 19, (c) generates a reset control signal rstpwm for the PWM comparator 16 to output it to the PWM comparator 16, (d) generates a PWM mode MPG pulse output permission signal pwmmpgon for the PWM comparator 16 to it to the PWM comparator 16, (e) generates a pulse skip forced release signal pwmfix for the skip comparator 17 to output it to the skip comparator 17, and (f) generates a gate signal pgate for the output switch element PDRV to apply it to a gate of the output switch element PDRV, and generates a gate signal ngate for the rectification switch element NDRV to apply it to a gate of the rectification switch element NDRV.

Moreover, the switching control circuit 10 further has a function, upon receiving the backflow detection signal noffb outputted from the backflow detection circuit 20, by causing the rectification switch element NDRV to turn off, to prevent the current from flowing from the connection point LX to the sides of the switch elements PDRV and NDRV. In other words, when the backflow detection circuit 20 outputs the backflow detection signal noffb indicating a state where generation of the reverse current is detected, the switching control circuit 10 causes the rectification switch element NDRV to turn off and be in a cut off state.

Figure 2:
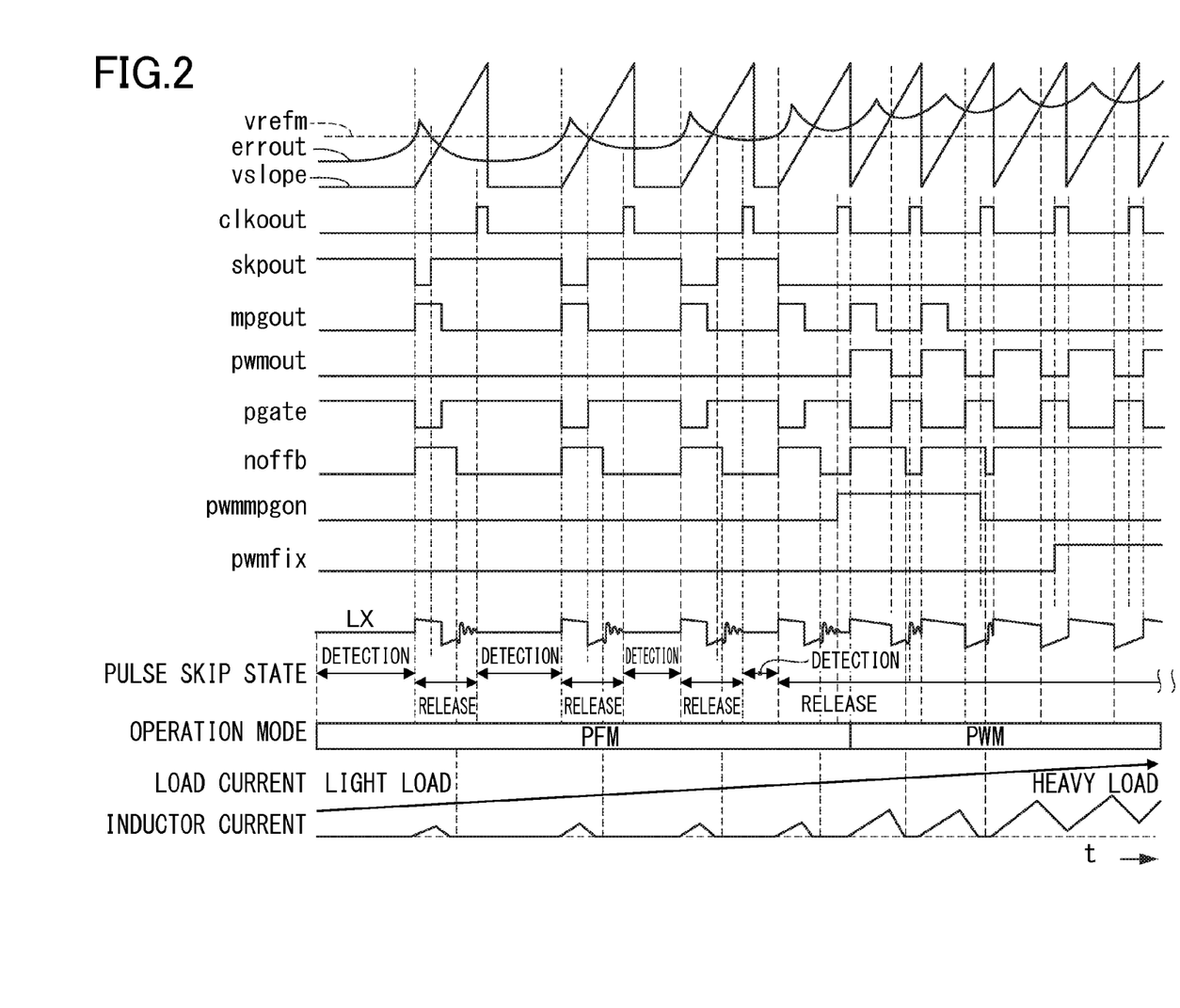
FIG. 2 is a timing chart illustrating internal signals in the switching regulator 1 of FIG. 1 in a state where a PFM control is shifted to a PWM control when a load variation from a light load side to a heavy load side occurs.
Figure 3:
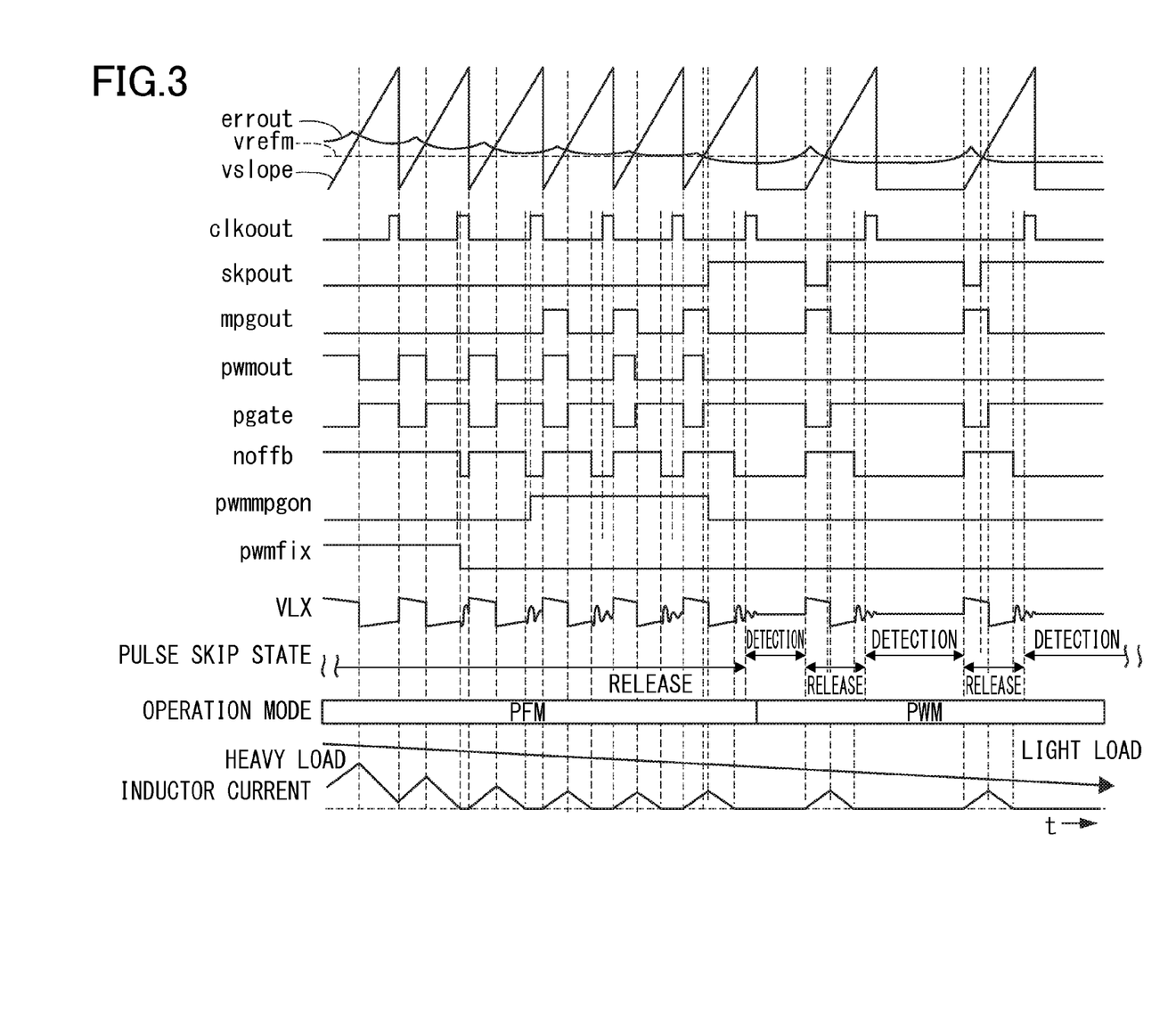
FIG. 3 is a timing chart illustrating respective internal signals in the switching regulator 1 of FIG. 1 in a state where the PWM control is changed to the PFM control when a load variation from the heavy load side to the light load side occurs.

Next, using FIG. 2 and FIG. 3, a switching control between the PFM control and the PWM control by the switching regulator according to the embodiment of the present invention will be described. FIG. 2 is a timing chart illustrating respective internal signals in the switching regulator 1 of FIG. 1 in a state where the PFM control is shifted to the PWM control when a load variation from the light load side to the heavy load side occurs. Moreover, FIG. 3 is a timing chart illustrating respective internal signals in the switching regulator 1 of FIG. 1 in a state where the PWM control is shifted to the PFM control when a load variation from the heavy load side to the light load side occurs. The switching control circuit 10 has the abovementioned function of controlling switching between the PFM control and the PWM control.

Firstly, with reference to FIG. 2, a switching control operation from the PFM control to the PWM control when a load variation from the light load side to the heavy load side occurs will be described. Here, the light load means the load RL (for example, a resistance value thereof) less than a predetermined first threshold, and the heavy load means the load RL not less than more than the abovementioned first threshold or a second threshold which is not less than the abovementioned first threshold.

In FIG. 2, in a PFM control state at the light load, in a pulse skip state, the pulse skip detection signal skpout is at H level, and both the output switch element PDRV and the rectification switch element NDRV are in an off state. Here, when the load RL increases to lower the output voltage Vout, the signal level of the error voltage errout rises to be higher than the pulse skip reference voltage vrefm, the pulse skip detection signal skpout from the skip comparator 17 changes form the H level to the L level to release the pulse skip state, the reset control of the oscillation circuit 15 is released (the reset control signal changes from the H level to the L level) due to the edge of change from the H level to the L level of the pulse skip detection signal skpout, and the oscillation circuit 15 generates and outputs the clock signal clkout. Further, simultaneously, due to the edge of change from the H level to the L level of the pulse skip detection signal skpout, the one pulse generation circuit 19 generates and outputs the one pulse signal mpgout. Here, the pulse width of the one pulse signal mpgout becomes an on time period of the output switch element PDRV without any change. When the on time period of the output switch element PDRV during the pulse width of the one pulse signal mpgout is completed, the switching control circuit 10 changes the reset control signal from the L level to the H level to cause the one pulse generation circuit 19 to be in a reset state, and the one pulse generation circuit 19 becomes again in the pulse skip state due to the synchronization of the pulse skip detection signal skpout which is a voltage level comparison result between the error voltage errout and the pulse skip reference voltage vrefm with the clock signal clkout.

In addition, when the load RL decreases and the load current increases, the skip comparator 17 changes the pulse skip detection signal skpout from the H level to the L level to release the abovementioned pulse skip state of the one pulse generation circuit 19, and the switching operations of the output switch element PDRV and the rectification switch element NDRV are completed in the pulse width of the one pulse signal mpgout outputted from the one pulse generation circuit 19. Further, at the next timing when the clock signal clkout changes from the L level to the H level, because the pulse skip detection signal skpout is in an L level state, the pulse skip release state is continued to proceed to a PWM mode in which on/off control of the output switch element PDRV and the rectification switch element NDRV is determined by the PWM signal pwmout indicating a determination result by the PWM comparator 16.

Moreover, when the clock signal clkout changes from the L level to the H level immediately after the switching operations of the switch elements PDRV and NDRV are completed in the pulse width of the one pulse signal mpgout, if the backflow detection signal noffb outputted from the backflow detection circuit 20 is at L level indicating that backflow detection is being detected, the switching control circuit 10 outputs a PWM mode MPG pulse output permission signal pwmmpgon at the H level to cause the one pulse generation circuit 19 to output the pulse width of the one pulse signal mpgout in the PWM mode.

Figure 4:
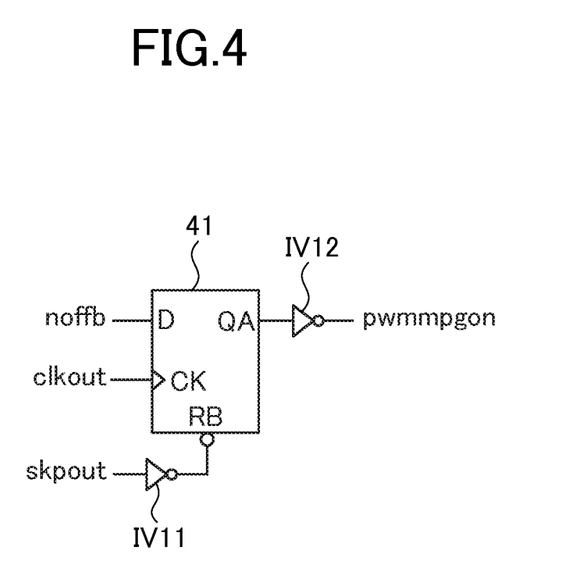
FIG. 4 is a circuit diagram illustrating a configuration example of a signal generation circuit for creating a PWM mode MPG pulse output permission signal pwmmpgon in a switching control circuit 10 of FIG. 1.

FIG. 4 is a circuit diagram illustrating a configuration example of a signal generation circuit for creating the PWM mode MPG pulse output permission signal pwmmpgon in the switching control circuit 10 of FIG. 1, and the signal generation circuit is configured to include a delay type flip-flop 41 and two inverters IV11 and IV12.

In FIG. 4, the reset of the flip-flop 41 is released when the pulse skip detection signal skpout is at L level, a backflow detection signal at L level indicating a backflow detection state is latched when the clock signal clkout changes from the L level to the H level, and a PWM mode MPG pulse output permission signal at H level is outputted. When the PWM mode MPG pulse output permission signal pwmmpgon is at H level, the one pulse generation circuit 19 outputs the one pulse signal mpgout having a predetermined pulse width in synchronization with the edge of the PWM signal pwmout from the L level to the H level.

Figure 5:
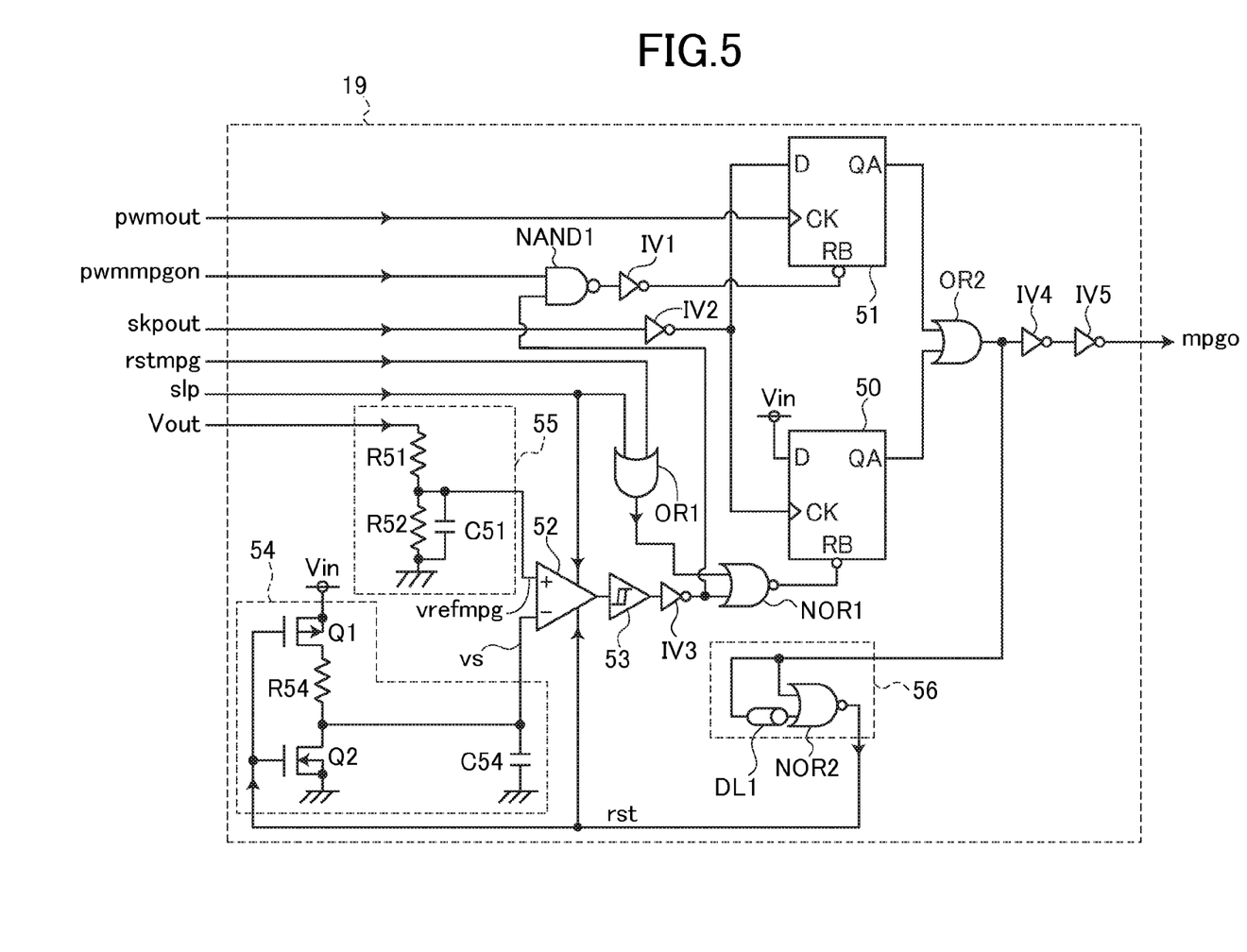
FIG. 5 is a circuit diagram illustrating a concrete configuration example of a one pulse generation circuit 19 of FIG. 1.

FIG. 5 is a circuit diagram illustrating a concrete configuration example of the one pulse generation circuit 19 of FIG. 1. In FIG. 5, the one pulse generation circuit 19 is inputted with the input voltage Vin, the output voltage Vout, the pulse skip detection signal skpout, a reset control signal retmpg, a sleep signal slp, the PWM mode MPG pulse output permission signal pwmmpgon, and the PWM signal pwmout, and in response to these, the one pulse generation circuit 19 outputs the one pulse signal mpgout. The one pulse generation circuit 19 is configured to include flip-flops 50 and 51, a comparator 52, a Schmitt buffer 53, a slope generation circuit 54, a reference voltage generation circuit 55, a reset signal generation circuit 56 for the comparator 52 and the slope generation circuit 54, and other gate elements (NAND1, IV1 to IV5, OR1, OR2, and NOR1). Here, the slope generation circuit 54 is configured to include two MOS transistors Q1 and Q2, and a capacitor C54. Moreover, the reset signal generation circuit 56 is configured to include a delay element DL1 and a NOR gate NOR2.

In FIG. 5, when the sleep signal slp is at H level, or in a pulse skip state, the PWM mode MPG pulse output permission signal pwmmpgon is at L level and the reset control signal retmpg is at H level, the one pulse generation circuit 19 becomes in a sleep state, and outputs the one pulse signal mpgout at L level. Moreover, the reset signal generation circuit 56 for the comparator 52 and the slope generation circuit 54 outputs a reset signal rst at H level to make the comparator 52 and the slope generation circuit 54 be in a reset state. When the sleep signal is at L level, the PWM mode MPG pulse output permission signal pwmmpgon is at L level, and the reset control signal retmpg is at L level, the reset of the flip-flop 50 is released, and the one pulse generation circuit 19 outputs the one pulse signal mpgout at H level in response to the edge of change of the pulse skip detection signal skpout from the L level to the H level.

Next, when the one pulse signal mpgout at H level is outputted, the reset signal generation circuit 56 for the comparator 52 and the slope generation circuit 54 outputs a reset signal rst at L level to release the reset of the comparator 52 and the slope generation circuit 54. In response to this, the slope generation circuit 54 becomes in a reset release state to charge the capacitor C54 from the input voltage Vin through a resistance R54 to form a slope voltage vs. The reference voltage generation circuit 55 generates a reference voltage vrefmpg of the comparator 52 such that resistances R51 and R52 voltage-divide the output voltage Vout, and a capacitor C51 holds the level. The comparator 52 in a reset release state compares the slope voltage vs with the reference voltage vrefmpg, after the reaction period determined by the following equation, and changes the one pulse signal mpgout from the H level to the L level. When the one pulse signal mpgout changes to the L level, the reset signal generation circuit 56 outputs a reset signal rst at H level to make the comparator 52 and the slope generation circuit 54 be in a reset state.

Further, when the sleep signal slp is at L level, the PWM mode MPG pulse output permission signal pwmmpgon is at L level, and the reset control signal retmpg is at L level, the comparator 52 and the slope generation circuit 54 remain in a reset state before the one pulse generation circuit 19 accepts the edge of change of the pulse skip detection signal skpout from the L level to the H level.

Moreover, in a state where the sleep signal sip is at L level and the reset control signal retmpg is at L level, when the PWM mode MPG pulse output permission signal pwmmpgon in the PWM mode is at H level, the reset of the flip-flop 51 is released. In response to the edge of change of the PWM signal pwmout from the L level to the H level, the one pulse signal mpgout at H level is outputted. After the one pulse signal mpgout at H level is outputted, with a control similar to the above, the one pulse signal mpgout changes from the H level to the L level, and the pulse width of the one pulse signal mpgout is controlled. Here, a pulse width Ton of the one pulse signal mpgout is expressed by the following equation.

$$Ton = C54 \times \{R52/(R51+R52)\} \times Vout \times (R54/Vin) \quad \text{Equation (1)}$$

Ton=the pulse width of the one pulse signal
mpgout=the on pulse width of the output switch
element PDRV  Equation (2)

As apparent from the Equation (1), the pulse width of the one pulse signal mpgout indicates the duty ratio≅Vout/Vin, in other words, the pulse width of the one pulse signal mpgout has a duty ratio dependency determined by the output voltage Vout and the input voltage Vin. Here, the capacitor C54 and the resistance R54 in the slope generation circuit 54, and the resistances R51 and R52 in the reference voltage generation circuit 55 are adjusted to allow the desired pulse width of the one pulse signal mpgout to be adjusted, and the on time period of the output switch element PDRV in the PFM control operation to be adjusted. Moreover, the switching control circuit 10 performs a control such that the logical addition of the PWM signal pwmout and the one pulse signal mpgout becomes the on time period of the output switch element PDRV, on/off of the output switch element PDRV and the rectification switch element NDRV is determined.

In addition, subsequently, when the load RL decreases and the load current increases, the pulse skip release state indicated by the pulse skip detection signal skpout at L level is continued to set the PWM mode, and immediately after the on operation of the rectification switch element NDRV change of the clock signal clkout from the L level to the H level is generated, because the current of the inductor L1 does not become zero during the on period of the rectification switch element NDRV, a state where the backflow detection circuit 20 detects no backflow (in a state where the backflow detection signal noffb is at H level) is latched, the PWM mode MPG pulse output permission signal pwmmpgon at L level is outputted, and the PWM mode MPG pulse output permission period is completed.

Moreover, in the state where the backflow detection circuit 20 detect no backflow (state where the backflow detection signal noffb is at H level), change of the clock signal clkout from the L level to the H level is counted n times (n is an integer of 1 or more, in other words, a natural number), the pulse skip forced release signal pwmfix=H is inputted from the switching control circuit 10 to the skip comparator 17 such that the skip comparator 17 pulls down the pulse skip detection signal skpout to forcedly output the pulse skip detection signal skpout at L level. In the embodiment, a concrete example of n=2 is indicated.

Figure 6:
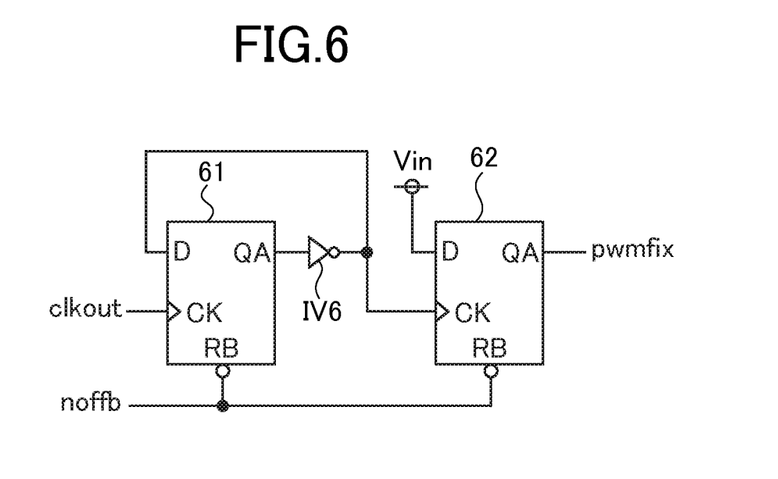
FIG. 6 is a circuit diagram illustrating a configuration example of a signal generation circuit for creating a pulse skip forced release signal pwmfix in the switching control circuit 10 of FIG. 1.

FIG. 6 is a circuit diagram illustrating a configuration example of a signal generation circuit for creating the pulse skip forced release signal pwmfix in the switching control circuit 10 of FIG. 1, and the signal generation circuit is configured to include two delay type flip-flops 61 and 62, and an inverter IV6.

In FIG. 6, after the reset of the flip-flops 61 and 62 is released by the backflow detection signal noffb at H level, when the clock signal clkout changes from the L level to the H level, if two pulses of the clock signal clkout are counted in a state where the backflow detection signal noffb is at H level, a pulse skip forced release signal pwmfix at H level is outputted. In other words, this means that with respect to the range of the load current in which a backflow is detected, a function capable of detecting a pulse skip is on to make the PFM control be effective, and that with respect to the range of the load current in which a backflow is not detected, a function of detecting a pulse skip is off to allow the PFM control to be forcedly shifted to the PWM control.

Next, using FIG. 3, a switching control operation from the PWM control to the PFM control when a load variation from the heavy load side to the light load side occurs will be described.

In FIG. 3, in a state where no backflow is detected (the backflow detection signal noffb, is at H level) at the heavy load under the PWM control, because the pulse skip forced release signal pwmfix is at H level and the PWM mode MPG pulse output permission signal pwmmpgon is at L level, a pulse skip is difficult to be detected. Further, when the load RL gradually increases, the load current decreases, a backflow detection under the PWM control is generated, and the backflow detection signal noffb changes from the H level to the L level, the pulse skip forced release signal pwmfix changes from the H level to the L level to allow a pulse skip to be detected.

In addition, the load current decreases, a state where the pulse skip detection signal skpout at L level indicating that no pulse skip is detected is held, and a backflow detection is generated under the PWM control (state where the backflow detection signal noffb is at L level) is latched with the edge of change of the clock signal clkout from the L level to the H level, the PWM mode MPG pulse output permission signal pwmmpgon changes from the L level to the H level, and a PWM mode MPG pulse output permission is generated and established. if this condition is established, the one pulse generation circuit 19 outputs the one pulse signal mpgout in synchronization with the PWM signal pwmout, an on time period of the output switch element PDRV becomes the pulse width of either one having a longer pulse width between the PWM signal pwmout and the one pulse signal mpgout, and on/off of the output switch element PDRV and the rectification switch element NDRV is determined.

In addition, when the load current decreases and the duty ratio under the PWM control becomes small, the size relation between the pulse widths of the PWM signal pwmout and the one pulse signal mpgout becomes pwmout<mpgout. Here, the on time period of the output switch element PDRV is determined by the one pulse signal mpgout. As a result, the signal level of the error voltage errout is decreased to be lower than the pulse skip reference voltage vrefm, and the skip comparator 17 changes the pulse skip detection signal skpout from the L level to the H level to detect a pulse skip state, thereby shifting to the PFM control.

In other words, this means that with respect to the range of the load current in which a backflow is detected under the PWM control, if not only the PWM signal pwmout but also the fixed one pulse signal mpgout having a duty ratio dependency determined by the output voltage Vout and the input voltage Vin is outputted in synchronization with the PWM signal pwmout, the duty ratio of the PWM control to be the pulse width of the PWM signal pwmout becomes smaller than the duty ratio of the one pulse signal mpgout to make the on time period of the output switch element PDRV be longer and increase a variation of the error voltage errout, thereby achieving easy detection of a pulse skip.

SUMMARY OF EMBODIMENT

A switching regulator 1 according to the present embodiment is a non-isolated type switching regulator which converts an input voltage Vin inputted to an input terminal into a predetermined constant voltage to output the constant voltage as an output voltage Vout from an output terminal through an inductor L1 to a load RL, and has a switching function between a PWM control and a PFM control. The abovementioned switching regulator 1 includes: (a) an output switch element PDRV which performs switching in accordance with a gate signal pgate serving as a control signal inputted to a gate serving as a control electrode, and charges the inductor L1 with the input voltage Vin; (b) a rectification switch element NDRV which discharges the inductor L1 when the output switch element PDRV is turned off to stop the charging to the inductor L1; (c) an oscillation circuit 15 which outputs a clock signal having a predetermined oscillation frequency; (d) an error amplifier circuit 13 which amplifies a voltage difference between a feedback voltage vfb proportional to the output voltage Vout and a predetermined first reference voltage vref, and outputs an error voltage errout; (e) a slope circuit 14 which generates a saw-tooth wave vslope providing a voltage change set in advance so as to be in synchronization with the switching of the output switch element PDRV; (f) a PWM comparator 16 serving as a first voltage comparison circuit which compares a voltage of the saw-tooth wave vslope and the error voltage errout, and generates and outputs a PWM signal pwmout serving as a first comparison signal indicating a result of the comparison; (g) a skip comparator 17 serving as a second voltage comparison circuit which compares the error voltage errout and a predetermined second reference voltage vrefm, and generates and outputs a pulse skip detection signal skpout serving as a second comparison signal indicating a result of the comparison; (h) a one pulse generation circuit 19 which generates a one pulse signal mpgout having a predetermined pulse width; (i) a switching control circuit 10 which controls switching for the output switch element PDRV and the rectification switch element NDRV on the basis of the clock signal clkout, the PWM signal pwmout serving as the first comparison signal, the pulse skip detection signal skpout serving as the second comparison signal, and the one pulse signal mpgout; and (j) a backflow detection circuit 22 which detects a sign of generation of a reverse current or generation of the reverse current, the reverse current flowing from the output terminal to the rectification switch element NDRV side through the inductor L1 on the basis of a voltage VLX at a connection point LX between the output switch element PDRV and the rectification switch element NDRV.

Here, the predetermined second reference voltage vrefm has a dependency on the input voltage Vin and the output voltage Vout, and is arbitrarily set between a lower limit value and an upper limit value of the saw-tooth wave vslope.

The switching control circuit 10 controls the oscillation circuit 15 such that the oscillation circuit 15 starts an oscillation operation to output the clock signal clkout in accordance with the pulse skip detection signal skpout serving as the second comparison signal, and controls the one pulse generation circuit 19 such that the one pulse generation circuit 19 outputs the one pulse signal mpgout. Moreover, the switching control circuit 10 controls the PWM comparator 16 serving as the first voltage comparison circuit such that the PWM comparator 16 serving as the first voltage comparison circuit turns on/off in accordance with the pulse skip detection signal skpout serving as the second comparison signal and the clock signal clkout. In addition, the switching control circuit 10 controls the output switch element PDRV such that the pulse width of the one pulse signal mpgout becomes an on time period of the output switch element PDRV.

The switching control circuit 10 performs a control to perform a PFM control operation in which a switching cycle of the output switch element PDRV is changed while the on time period thereof is fixed, on the basis of the pulse skip detection signal skpout serving as the second comparison signal, the clock signal clkout, the pulse width of the one pulse signal mpgout, in a case of a light load where the load RL is less than a predetermined first threshold. By contrast, the switching control circuit 10 performs a control to perform a PWM control operation in which the on time period of the output switch element PDRV is changed while the switching cycle thereof is fixed, on the basis of the pulse skip detection signal skpout serving as the second comparison signal, the clock signal clkout, and the PWM signal pwmout serving as the output signal from the PWM comparator 16 serving as the first voltage comparison circuit, in a case of a heavy load where the load RL is not less than the first threshold, or not less than a second threshold which is more than the first threshold. Accordingly, the switching control circuit 10 performs a control such that the PFM control and the PWM control are automatically switched on the basis of the pulse skip detection signal skpout serving as the second comparison signal and the clock signal clkout.

The skip comparator 17 serving as the second voltage comparison circuit changes a signal level of the pulse skip detection signal skpout serving as the second comparison signal on the basis of a combination state of the backflow detection signal noffb and the clock signal clkout to cause the one pulse signal mpgout to have the dependency on the input voltage Vin and the output voltage Vout, to change the on time period of the output switch element PDRV on the basis of the input voltage Vin and the output voltage Vout, and to output the one pulse signal mpgout using the PWM signal pwmout serving as the first comparison signal as a trigger on the basis of a combination state of the pulse skip detection signal skpout serving as the second comparison signal, the backflow detection signal noffb, and the clock signal clkout.

In the abovementioned the switching regulator 1, the one pulse generation circuit 19 releases a reset state with the second comparison signal and generates the one pulse signal mpgout, is automatically again in the reset state when the generation of the one pulse signal mpgout is completed, continues the reset state when the PWM control is selected on the basis of the pulse skip detection signal skpout serving as the second comparison signal, and releases the reset allowing the one pulse signal mpgout to be generated with the pulse skip detection signal skpout serving as the second comparison signal when the PFM control is selected to continuously reduce the consumption current of the one pulse generation circuit 19 until the pulse skip detection signal skpout serving as the second comparison signal changes, so as to be in a state where a pulse skip under the PFM control is released.

Moreover, in the abovementioned switching regulator 1, the pulse width of the one pulse signal mpgout is set equal to the on time period of the output switch element PDRV immediately after the PFM control is switched to the PWM control on the basis of the pulse skip detection signal skpout serving as the second comparison signal and the clock signal clkout.

In addition, in the abovementioned switching regulator 1, the switching control circuit 10 (a) fixes the output level of the pulse skip detection signal skpout serving as the second comparison signal such that the PWM control is fixedly performed, when the output level of the backflow detection signal noffb indicating a state where no generation of the reverse current is detected is detected during a period when the number of the clock signals clkout counted becomes a natural number n, and (b) operates the voltage comparison by the skip comparator 17 as the second voltage comparison circuit, when the backflow detection signal noffb is at an output level indicating a state where generation of the reverse current is detected.

Still Further, in the abovementioned switching regulator 1, the one pulse generation circuit 19 (a) generates the one pulse signal mpgout on the basis of change of the pulse skip detection signal skpout serving as the second comparison signal under the PFM control, and (b) outputs the one pulse signal mpgout using change of the output level of the PWM signal pwmout serving as the first comparison signal as a trigger, if the switching control circuit 10 latches the output level of the backflow detection signal noffb indicating a state where the generation of the reverse current is detected in synchronization with the clock signal clkout, even in a state where the output level of the pulse skip detection signal skpout serving as the second comparison signal is determined as the PWM control.

Moreover, in the abovementioned switching regulator 1, the second reference voltage vrefm has a dependency on the input voltage Vin and the output voltage Vout, and is set such that the output current outputted from the output terminal when the PFM control is shifted to the PWM control has a current value equal to that of the output current at a critical point to shift from a discontinuous operation mode controlling to prevent a backflow from the inductor L1 to the rectification switch element NDRV side to a continuous operation mode.

Further, in the abovementioned switching regulator 1, the slope circuit 14 shifts, on the basis of the saw-tooth wave outputted from the oscillation circuit 15 and synchronized with the clock signal clkout, the level of the saw-tooth wave vlospe within a voltage range set in advance in such a manner that the error voltage errout of the error amplifier circuit 13 can hold a gain of a predetermined value or more, and outputs the saw-tooth wave vlospe.

Still Further, in the abovementioned switching regulator 1, when the backflow detection circuit 22 outputs the backflow detection signal noffb indicating a state where generation of the reverse current is detected, the switching control circuit 10 causes the rectification switch element NDRV to turn off and be in a cut off state.

Embodiment of Function and Effect

As described above, with the embodiment according to the present invention, it is possible to operate a function of forcedly shifting to the PWM control in a state where no backflow of a current of the inductor L1 is detected, and performing a pulse skip control under the PFM control only in a state where a backflow of a current of the inductor L1 is detected.

Moreover, if a backflow of the inductor current is detected under the PWM control, it is possible to easily shift to the PFM control because a fixed one pulse in synchronization with the switching under the PWM control and having a duty ratio dependency determined by the output voltage and the input voltage is outputted, and when the one pulse width becomes larger than the width of the duty ratio in the switching under the PWM control, the on time period of the switch element becomes longer, and the output variation amount of the error amplifier circuit 13 becomes larger.

With these results, it is possible to provide a switching regulator capable of further suppressing variations to be stabilized with respect to a target value of the load current for switching between the PWM control and the PFM control, and ensuring the switching from the PFM control to the PWM control or from the PWM control to the PFM control even if various parameters including external elements such as chips, coils, and capacitors vary.

Although the example in which the present invention is applied to a step-down type switching regulator has been described in the above embodiment, the present invention is not limited thereto, and can be applied to a current feedback type step-down type switching regulator in which a switching control is performed such that an inductor current is sensed from a voltage at a connection point between an output switch and an inductor and adds to an output of a slope circuit to create a lamp voltage proportional to the inductor current, a step-down switching regulator of an asynchronous rectification method in which a diode instead of a transistor is used for a rectification switch element, and a step-up type switching regulator.

Therefore, according to the embodiment of the present invention, it is possible to forcedly shift to the PWM control in a state where no backflow of a current of the inductor is detected, and to operate a function of performing a pulse skip control under the PFM control only in a state where a backflow of the inductor current is detected.

Moreover, if a backflow of the inductor current is detected under the PWM control, it is possible to easily shift to the PFM control because the one pulse generation circuit outputs a one pulse signal in synchronization with the switching under the PWM control, and when the pulse width the one pulse signal becomes larger than the width of the duty ratio in the switching under the PWM control, the on time period of the switch element becomes longer, and the output variation amount of the error amplifier circuit becomes larger.

Furthermore, it is possible to provide a switching regulator capable of further suppressing and stabilizing variations with respect to a target value of the load current for switching between the PWM control and the PFM control, and ensuring the switching from the PFM control to the PWM control or from the PWM control to the PFM control even if various parameters including external elements such as chips, coils, and capacitors vary.

Although the present invention has been described in terms of exemplary embodiments, it is not limited thereto. It should be appreciated that variations may be made in the embodiments described by persons skilled in the art without departing from the scope of the present invention defined by the following claims.

CROSS-REFERENCE TO RELATED APPLICATIONS

The present application is based on and claims priority from Japanese Patent Application Number 2012-194276, filed Sep. 4, 2012, the disclosure of which is hereby incorporated reference herein in its entirety.

The invention claimed is:

1. A non-isolated type switching regulator which converts an input voltage inputted to an input terminal into a predetermined constant voltage and outputs the constant voltage as an output voltage from an output terminal to a load through an inductor, and has a switching function between a PWM control and a PFM control, the switching regulator comprising:
   an output switch element which performs switching in accordance with a control signal inputted to a control electrode, and charges the inductor with the input voltage;
   a rectification switch element which discharges the inductor when the output switch element is turned off to stop the charging to the inductor;
   an oscillation circuit which outputs a clock signal having a predetermined oscillation frequency;
   an error amplifier circuit which amplifies a voltage difference between a feedback voltage proportional to the output voltage and a predetermined first reference voltage, and outputs the voltage difference as an error voltage;
   a slope circuit connected to the oscillation circuit to receive the clock signal from the oscillation circuit as an input to the slope circuit, and generate (i) a saw-tooth wave, based on the clock signal from the oscillation circuit, the saw-tooth wave providing a voltage change set in advance so as to be in synchronization with the switching of the output switch element and (ii) a predetermined second reference voltage;
   a first voltage comparison circuit which compares a voltage of the saw-tooth wave received from the slope circuit and the error voltage, and generates and outputs a first comparison signal indicating a result of the comparison;
   a second voltage comparison circuit which compares the error voltage and the predetermined second reference voltage received from the slope circuit, and generates and outputs a second comparison signal indicating a result of the comparison;
   a one pulse generation circuit which generates a one pulse signal having a predetermined pulse width;
   a control circuit which controls switching for the output switch element and the rectification switch element on the basis of the clock signal, the first comparison signal, the second comparison signal, and the one pulse signal; and
   a backflow detection circuit which detects a sign of generation of a reverse current or generation of the reverse current, the reverse current flowing from the output terminal to the rectification switch element side through the inductor, on the basis of a voltage at a connection point between the output switch element and the rectification switch element,
   wherein the predetermined second reference voltage has a dependency on the input voltage and the output voltage, and is arbitrarily set between a lower limit value and an upper limit value of the saw-tooth wave, and
   the control circuit controls the oscillation circuit such that the oscillation circuit starts an oscillation operation to output the clock signal in accordance with the second comparison signal, and controls the one pulse generation circuit such that the one pulse generation circuit outputs the one pulse signal, controls the first voltage comparison circuit such that the first voltage comparison circuit turns on/off in accordance with the second comparison signal and the clock signal, and controls the output switch element such that the pulse width of the one pulse signal becomes an on time period of the output switch element,
   the control circuit performs a control to perform a PFM control operation in which a switching cycle of the output switch element is changed while the on time period thereof is fixed, on the basis of the second comparison signal, the clock signal, the pulse width of the one pulse signal, in a case of a light load where the load is less than a predetermined first threshold, and performs a control to perform a PWM control operation in which the on time period of the output switch element is changed while the switching cycle thereof is fixed, on the basis of the second comparison signal, the clock signal, and the output signal from the first voltage comparison circuit, in a case of a heavy load where the load is not less than the first threshold, or not less than a second threshold which is more than the first threshold,
   the control circuit performs a control such that the PFM control and the PWM control are automatically switched on the basis of the second comparison signal and the clock signal, and
   the second voltage comparison circuit changes a signal level of the second comparison signal on the basis of a combination state of a backflow detection signal as an output of the backflow detection circuit and the clock signal to cause the one pulse signal to have the dependency on the input voltage and the output voltage, to change the on time period of the output switch element on the basis of the input voltage and the output voltage, and to output the one pulse signal using the first comparison signal as a trigger on the basis of a combination state of the second comparison signal, the backflow detection signal, and the clock signal.

2. The switching regulator according to claim 1, wherein the one pulse generation circuit releases a reset state with the second comparison signal and generates the one pulse signal, is automatically again in the reset state when the generation of the one pulse signal is completed, continues the reset state when the PWM control is selected on the basis of the second comparison signal, and releases the reset allowing the one pulse signal to be generated with the second comparison signal when the PFM control is selected to continuously reduce the consumption current of the one pulse generation circuit until the second comparison signal changes, so as to be in a state where a pulse skip under the PFM control is released.

3. The switching regulator according to claim 1, wherein the pulse width of the one pulse signal is set equal to the on time period of the output switch element immediately after the PFM control is switched to the PWM control on the basis of the second comparison signal and the clock signal.

4. The switching regulator according to claim 1, wherein the control circuit fixes an output level of the second comparison signal such that the PWM control is fixedly performed, when an output level of the backflow detection signal indicating a state where no generation of the reverse current is detected is detected during a period when the number of the clock signals counted becomes a natural number n, and operates the voltage comparison by the second voltage comparison circuit, when the backflow detection signal is at an output level indicating a state where generation of the reverse current is detected.

5. The switching regulator according to claim 1, wherein the one pulse generation circuit generates the one pulse signal on the basis of change of the second comparison signal under the PFM control, and outputs the one pulse signal using change of the output level of the first comparison signal as a trigger, if the control circuit latches the output level of the backflow detection signal indicating a state where generation of the reverse current is detected in synchronization with the clock signal, even in a state where the output level of the second comparison signal is determined as the PWM control.

6. The switching regulator according to claim 1, wherein the second reference voltage has a dependency on the input voltage and the output voltage, and is set such that the output current outputted from the output terminal when the PFM control is shifted to the PWM control has a current value equal to that of the output current at a critical point to shift from a discontinuous operation mode controlling to prevent a backflow from the inductor to the rectification switch element side to a continuous operation mode.

7. The switching regulator according to claim 1, wherein the slope circuit shifts, on the basis of the saw-tooth wave in synchronization with the clock signal outputted from the oscillation circuit, the level of the saw-tooth wave within a voltage range set in advance in such a manner that the error voltage of the error amplifier circuit can hold a gain of a predetermined value or more, and outputs the saw-tooth wave.

8. The switching regulator according to claim 1, wherein when the backflow detection circuit outputs the backflow detection signal indicating a state where generation of the reverse current is detected, the control circuit causes the rectification switch element to turn off and be in a cut off state.

9. A control method of a non-isolated type switching regulator which converts an input voltage inputted to an input terminal into a predetermined constant voltage and outputs the constant voltage as an output voltage from an output terminal to a load through an inductor, and has a switching function between a PWM control and a PFM control, the switching regulator including:
  an output switch element which performs switching in accordance with a control signal inputted to a control electrode, and charges the inductor with the input voltage;
  a rectification switch element which discharges the inductor when the output switch element is turned off to stop the charging to the inductor;
  an oscillation circuit which outputs a clock signal having a predetermined oscillation frequency;
  an error amplifier circuit which amplifies a voltage difference between a feedback voltage proportional to the output voltage and a predetermined first reference voltage, and outputs the voltage difference as an error voltage;
  a slope circuit connected to the oscillation circuit to receive the clock signal from the oscillation circuit as an input to the slope circuit, and generate (i) a saw-tooth wave, based on the clock signal from the oscillation circuit, the saw-tooth wave providing a voltage change set in advance so as to be in synchronization with the switching of the output switch element and (ii) a predetermined second reference voltage;
  a first voltage comparison circuit which compares a voltage of the saw-tooth wave received from the slope circuit and the error voltage, and generates and outputs a first comparison signal indicating a result of the comparison;
  a second voltage comparison circuit which compares the error voltage and the predetermined second reference voltage received from the slope circuit, and generates and outputs a second comparison signal indicating a result of the comparison;
  a one pulse generation circuit which generates a one pulse signal having a predetermined pulse width;
  a control circuit which controls switching for the output switch element and the rectification switch element on the basis of the clock signal, the first comparison signal, the second comparison signal, and the one pulse signal; and
  a backflow detection circuit which detects a sign of generation of a reverse current or generation of the reverse current, the reverse current flowing from the output terminal to the rectification switch element side through the inductor, on the basis of a voltage at a connection point between the output switch element and the rectification switch element, wherein the predetermined second reference voltage having a dependency on the input voltage and the output voltage and being arbitrarily set between a lower limit value and an upper limit value of the saw-tooth wave,
  the control method comprises the steps, performed by the control circuit, of:
  controlling the oscillation circuit such that the oscillation circuit starts an oscillation operation to output the clock signal in accordance with the second comparison signal, and controlling the one pulse generation circuit such that the one pulse generation circuit outputs the one pulse signal;
  controlling the first voltage comparison circuit such that the first voltage comparison circuit turns on/off in accordance with the second comparison signal and the clock signal;
  controlling the output switch element such that the pulse width of the one pulse signal becomes an on time period of the output switch element, performing a control to perform a PFM control operation in which a switching cycle of the output switch element is changed while the on time period thereof is fixed, on the basis of the second comparison signal, the clock signal, the pulse width of the one pulse signal, in a case of a light load where the load is less than a predetermined first threshold, and performing a control to perform a PWM control operation in which the on time period of the output switch element is changed while the switching cycle thereof is fixed, on the basis of the second comparison signal, the clock signal, and the output signal from the first voltage comparison circuit, in a case of a heavy load where the load is not less than the first threshold, or not less than a second threshold which is more than the first threshold; and performing a control such that the PFM control and the PWM control are automatically switched on the basis of the second comparison signal and the clock signal.

* * * * *